United States Patent
Cheng et al.

(10) Patent No.: US 7,502,395 B2
(45) Date of Patent: Mar. 10, 2009

(54) PULSED COHERENT FIBER ARRAY AND METHOD

(75) Inventors: Eric Chiu-Tat Cheng, Torrance, CA (US); Robert Rex Rice, Simi Valley, CA (US); Michael Gordon Wickham, Rancho Palos Verdes, CA (US); Mark Ernest Weber, Hawthorne, CA (US)

(73) Assignee: Northrop Grumman Space & Mission Systems Corp., Los Angeles, CA (US)

( * ) Notice: Subject to any disclaimer, the term of this patent is extended or adjusted under 35 U.S.C. 154(b) by 387 days.

(21) Appl. No.: 11/500,661

(22) Filed: Aug. 8, 2006

(65) Prior Publication Data

US 2008/0037028 A1 Feb. 14, 2008

(51) Int. Cl.
*G01B 9/02* (2006.01)
*H01S 3/13* (2006.01)

(52) U.S. Cl. ......................................... 372/32; 356/477
(58) Field of Classification Search ................. 356/450, 356/477, 484; 372/6, 9, 25, 29.016, 29.023, 372/32
See application file for complete search history.

(56) References Cited

U.S. PATENT DOCUMENTS

| | | | |
|---|---|---|---|
| 5,694,408 A * | 12/1997 | Bott et al. ....................... 372/6 |
| 5,832,006 A | 11/1998 | Rice et al. |
| 5,847,816 A * | 12/1998 | Zediker et al. .............. 356/5.09 |
| 6,167,024 A | 12/2000 | Upton et al. |
| 6,233,085 B1 * | 5/2001 | Johnson ....................... 359/279 |
| 6,366,356 B1 * | 4/2002 | Brosnan et al. ............. 356/477 |
| 6,404,784 B2 * | 6/2002 | Komine .......................... 372/9 |
| 6,519,385 B1 * | 2/2003 | Green ........................... 385/27 |
| 6,597,836 B2 * | 7/2003 | Johnson et al. ............... 385/33 |
| 6,708,003 B1 * | 3/2004 | Wickham et al. ........... 398/102 |
| 6,717,719 B1 * | 4/2004 | Moore ......................... 359/340 |
| 6,813,069 B2 | 11/2004 | Rice et al. |
| 6,849,841 B2 * | 2/2005 | Byren et al. .............. 250/201.9 |
| 7,088,743 B2 * | 8/2006 | Rice et al. ....................... 372/6 |
| 7,154,590 B2 * | 12/2006 | Williams et al. ........... 356/5.15 |
| 7,221,499 B2 * | 5/2007 | Rice et al. .................... 359/349 |
| 7,230,958 B2 * | 6/2007 | Chang et al. .................... 372/3 |
| 7,233,433 B1 * | 6/2007 | Shay .......................... 359/349 |
| 7,336,363 B2 * | 2/2008 | Rothenberg ................. 356/450 |
| 7,343,098 B2 * | 3/2008 | Gerwe et al. ................. 398/120 |
| 2003/0002790 A1 * | 1/2003 | Johnson et al. ............... 385/33 |
| 2005/0169323 A1 * | 8/2005 | Spariosu et al. ................ 372/9 |
| 2006/0171428 A1 * | 8/2006 | Volodin ......................... 372/9 |

\* cited by examiner

*Primary Examiner*—Patrick J Connolly
*Assistant Examiner*—Scott M Richey
(74) *Attorney, Agent, or Firm*—John A. Miller; Miller IP Group, PLC

(57) ABSTRACT

A pulsed coherent fiber array laser system that includes a beam generating sub-system that provides a signal pulse beam having pulses of the desired duration that is split into several fiber channels. Optical leakage between the pulses in each split beam is measured and locked to a reference beam by a phase sensing circuit and phase adjusters so that the phase of each fiber pulsed beam is aligned with the phase of the reference beam. A pulse clipper or filter is employed to remove the pulses in the fiber beams so that they do not saturate the phase sensing circuit. The beam generating sub-system can employ any suitable combination of devices to generate the signal beam and the reference beam, including continuous wave master oscillators, amplitude modulators, frequency shifters, injection seed oscillators, Q-switched lasers, reference oscillators, frequency lockers, wavelength division multiplexers, time gated switches, etc.

23 Claims, 6 Drawing Sheets

PULSED COHERENT FIBER ARRAY AND METHOD

BACKGROUND OF THE INVENTION

1. Field of the Invention

This invention relates generally to a pulsed fiber array laser and, more particularly, to a pulsed fiber array laser that compares the phase of optical leakage between beam pulses in each fiber to a reference beam so that the phase of each fiber beam pulse can be phase-locked to the reference beam to provide a coherent laser array output beam without having to measure the phase of the pulses themselves.

2. Discussion of the Related Art

Coherent fiber array laser systems are known in the art for generating a good beam-quality laser beam from an array of fiber lasers. In recent years, there has been a rapid development of array laser architecture for high power laser weapon systems to destroy or "kill" distant targets, such as ballistic missiles, cruise missiles, bombers or the like. Known coherent array laser systems developed thus far have sometimes been tailored for these applications, where the laser runs in a continuous-wave (CW) mode or quasi-CW mode. Short pulsed (<10 nsec) fiber array lasers have been less developed in the art. Applications for such a pulsed array laser system include target range finding, target speed detection, remote chemical sensing, and remote target illumination. In particular, the scaling of pulsed fiber sources to pulse energies in the tens of milli-Joule (mJ) levels is highly desirable, the more so if the high efficiency, waveform characteristics and beam quality of the fiber source can be maintained.

It appears that coherent beam combining is the most promising method for scaling pulse energy beyond that achievable from a single fiber, which is currently limited to a few mJ. Depending on the intensity of the beam desired for a particular application, the fiber array may include 10-100 fibers. Perceived advantages of a pulsed coherent fiber array laser system include a factor of two to three in the improvement of overall system efficiency, significant packaging benefits and waveform flexibility.

Known fiber array laser systems employ some type of phase control that aligns the phase of each of the beams in the individual fibers to provide the coherent beam. Typically, the phase of each beam in each fiber is adjusted in order to phase-lock each beam to a common reference beam. Known coherent fiber array lasers are generally CW lasers where each of the individual fiber beams is on for a period of time that is long enough to measure the phase of the fiber beams, and to adjust the phase of each beam to phase-lock to the reference beam.

There is an interest in the art to develop a pulsed coherent fiber array laser system for various applications, where each pulse in the beam may be only on for less than 10 nanosecond, less than the required time needed for the known coherent beam combining phase-locking techniques. A pulsed coherent fiber array laser needs to control the phase of the beam pulses in each fiber in a very short period of time in order to provide the coherent beam. Currently, no pulsed coherent fiber array laser system is able to provide phase control of the individual beams fast enough.

SUMMARY OF THE INVENTION

In accordance with the teachings of the present invention, a pulsed coherent fiber array laser system is disclosed. The laser system includes a beam generating sub-system that provides a signal pulse beam having pulses of the desired duration that is split into several fiber channels. Each split channel beam then passes through a phase adjuster and a chain of amplifiers. The amplified beams are recombined and a small portion of the output beam is sampled for phase measurement relative to a reference beam. Optical leakage between the pulses in each split beam is used to measure the phase and to phase-lock each beam to a reference beam by a phase sensing circuit and phase adjusters. A pulse clipper or filter is employed to remove the pulses in the fiber beams so that they do not saturate the phase sensing circuit. The beam generating sub-system can employ any suitable combination of devices to generate the pulsed signal beam and the reference beam, including continuous wave laser master oscillators, amplitude modulators, frequency shifters, injection seeded laser oscillators, Q-switched lasers, reference laser oscillators, frequency lockers, wavelength division multiplexers, time gated switches, etc.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a pulsed coherent fiber array laser system is merely exemplary in nature, and is in no way intended to limit the invention or its applications or uses.

The present invention proposes a technique for locking the phase of the pulses produced by a pulsed laser array system to the phase of a reference beam. The technique includes generating optical leakage between pulses that is phase correlated with the pulses, measuring the phase of the optical leakage in each fiber signal beam, and locking the phase of the leakage to the reference beam so that the pulses themselves will be in phase with each other. Various techniques are known in the art for phase locking a signal beam to a reference beam. According to the invention, the phase of each beam pulse must be detected prior to arrival of the pulse. For pulse repetition rates less than 20 kHz, as determined by the typical phase noise spectrum in the fiber amplifiers, there must be leakage between the pulses to provide the phase determination.

Figure 1:
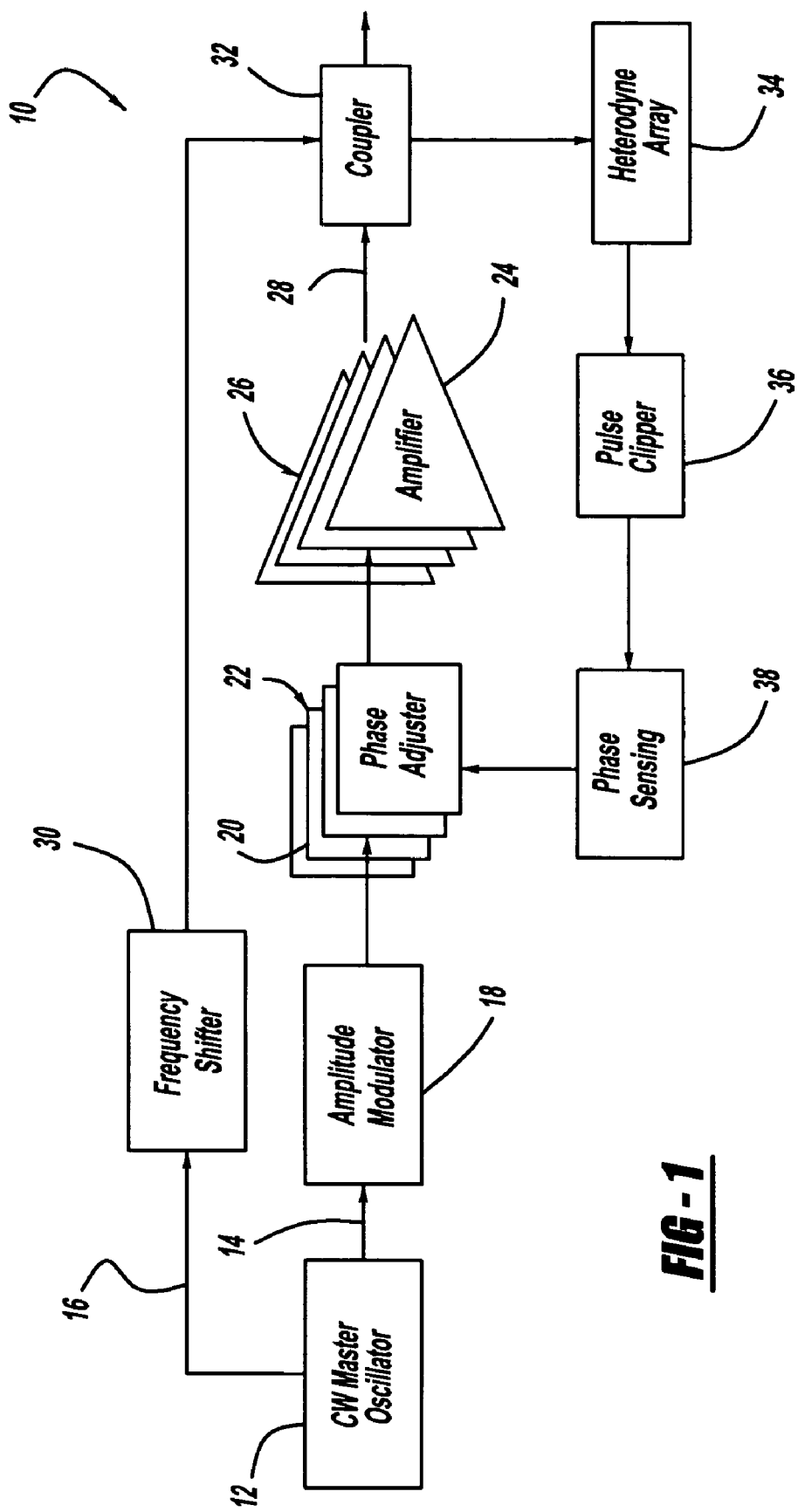
FIG. 1 is a schematic block diagram of a pulsed laser array system that employs a continuous wave master oscillator and an amplitude modulator, according to an embodiment of the present invention.

FIG. 1 is a schematic block diagram of a pulsed coherent fiber laser array system 10, according to an embodiment of the present invention. The system 10 includes a continuous wave (CW) master oscillator 12, whose output is split into a signal beam 14 and a reference beam 16. The signal beam 14 is amplitude modulated by an amplitude modulator 18 to generate signal beam pulses. The amplitude modulator 18 has a finite contrast ratio so that a small amount of signal beam is leaked through between pulses. Since the optical leakage and the signal beam pulses are derived from the same signal beam, the phase of the optical leakage is highly correlated, in fact phase-locked, with the signal beam pulses. The pulses will typically be on the order of 1-10 nano-seconds in duration with an appropriate time between the pulses for the purposes described below. The pulsed signal beam from the amplitude modulator 18 is split into a plurality of fiber beam channels, where a separate channel is provided for each fiber in the fiber array. As will be discussed in detail below, the optical leakage between the beam pulses in each fiber channel is locked to a reference beam by applying appropriate feedback to a phase adjuster 20 in an array 22 of phase adjusters. The coherent signal beam pulses in each fiber channel are then amplified by a chain of amplifiers 24 in an array of amplifier chains 26. The amplified signal beam pulses from each channel are then emitted and combined as a single coherent main beam 28 from the system 10.

The reference beam 16 is frequency shifted by a frequency shifter 30, and is combined with a portion of the main beam 28 by a coupler 32. The frequency shifter 30 shifts the frequency of the reference beam 16 for heterodyne signal generation. The coupled reference beam and main beam are then sent to a hederodyne array circuit 34 that converts the optical signal to an electrical signal. Any suitable detector array for this purpose can be used as the heterodyne array circuit 34, as will be appreciated by those skilled in the art.

As discussed above, the system 10 measures the phase difference between the frequency shifted reference beam 16 and the optical leakage between the pulses. However, the pulses also propagate through the heterodyne array circuit 34, and act to saturate the system electronics. Therefore, the pulses that are not used to measure the phase difference between the reference beam and the optical leakage are clipped by a pulse clipper circuit 36 to remove the pulses so that the only thing left in the signal is the optical leakage between the pulses and the reference beam. In one embodiment, the optical leakage between the pulses is about 45 dB down from the pulses. As is well known in the art of heterodyne detection, the optical leakage can be even smaller by having a more intense reference beam.

The combined reference beam and optical leakage is then sent to a phase sensor circuit 38 that measures the phase difference between the optical leakage and the reference beam for each fiber beam. The phase sensor circuit 38 provides a phase adjusting signal indicative of the phase difference between the optical leakage between each pulse in each pulsed fiber beam to each phase adjuster 20 to adjust the phase of the leakage between the pulses so that it is in phase with the reference beam. Therefore, the main beam 28 will be coherent in that all of the fiber beams will be at the same phase. The phase sensor circuit 38 can be any phase sensor circuit suitable for the purposes described herein, such as those used for continuous wave laser array systems. Suitable non-limiting examples can be found in U.S. Pat. No. 6,167,024, titled Multiple Channel Control Using Orthogonally Modulated Coded Drive Signals, issued Dec. 26, 2000 to Upton et al.; U.S. Pat. No. 6,366,356, titled High Average Power Fiber Laser System with High-Speed, Parallel Wavefront Sensor, issued Apr. 2, 2004 to Brosnan et al.; and U.S. Pat. No. 6,813,069, titled Method and Apparatus for Controlling a Fiber Optic Phased Array Utilizing Frequency Shifting, issued Nov. 2, 2004 to Rice et al.

Figure 2:
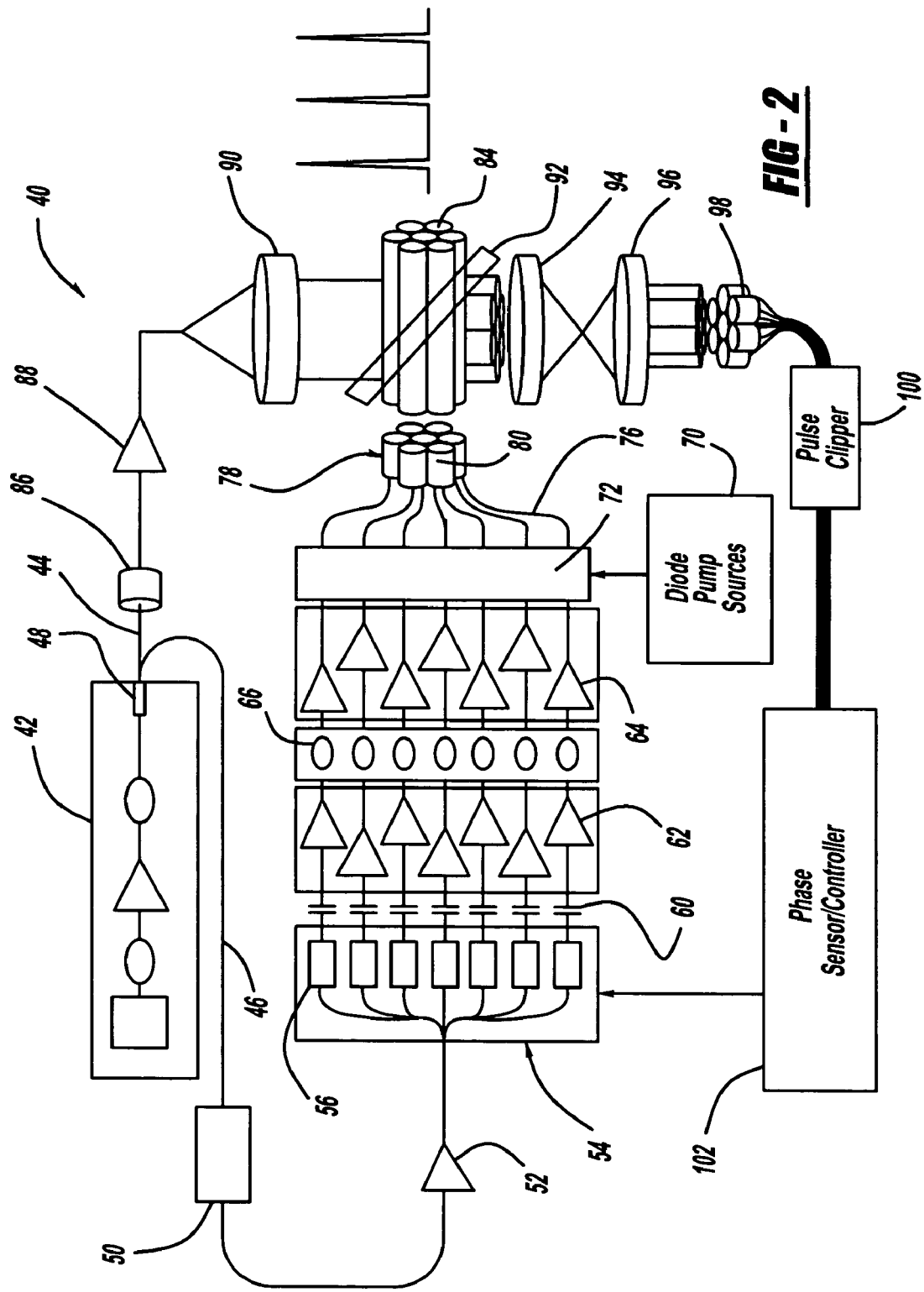
FIG. 2 is a detailed schematic diagram of the pulsed laser array system shown in FIG. 1.

FIG. 2 is a schematic diagram of a pulsed coherent fiber laser array system 40, according to an embodiment of the present invention. The system 40 is a detailed variation of the system 10. The system 40 includes a master oscillator 42 that can be any single frequency continuous wave laser suitable for the purposes described herein. The master oscillator 42 generates a continuous laser beam that is separated into two fibers 44 and 46 by a coupler 48 to provide a signal beam and a reference beam. The signal beam propagating on the fiber 44 is sent to an amplitude modulator 50 that amplitude modulates the beam to create a pulsed signal beam having pulses of a suitable duration. A small fraction of the signal beam is leaked through the modulator 50 between the pulsed signal. The pulsed signal beams are amplified by an amplifier 52 and split into a plurality of fiber channels by a beam splitter 54. The number of fiber channels would depend on the application and typically would be between 10 and 100. The beam splitter 54 also includes phase modulators 56 that control the phase of the beams in each fiber channel so that all of the beams are in phase, as will be discussed in more detail below. The beam splitter 54 can be any commercially available device suitable for the purposes discussed herein, many of which are known by those skilled in the art.

Each pulsed signal fiber beam in each channel is then sent to a path-length adjuster 60 that provides path-length matching for the fiber channels. Particularly, in order to couple the phase all of the fiber beams together, all of the path lengths of the fiber channels need to be the same. The path-length adjusters 60 are set at manufacture so that the manufacturing tolerances are overcome to provide the path-length matching in each fiber channel. Each fiber beam in each channel is then amplified by a pre-amplifier 62 and a power amplifier 64. An optical isolator 66 is provided between the pre-amplifiers 62 and the power amplifiers 64 to provide power isolation for the high intensity pulsed fiber beams provided by the power amplifiers 64. The pulsed fiber beams are amplified by the amplifiers 64 using a diode pump source 70. The diode pump source 70 provides pump light that is coupled into each of the fiber channels by pump couplers 72. The pump light travels in an opposite direction to the fiber beams through the amplifiers 64. The amplified pulsed fiber beams are then sent to a collimator array 78 that includes a plurality of tightly bunched lenses 80 that collimate the pulsed fiber beams into a collimated output beam 84. The collimated output beam 84 is emitted from the collimator array 78 as the output beam of the system 40.

The reference beam on the fiber 44 is sent through a frequency shifter 86 that shifts the frequency of the reference beam, an amplifier 88 that amplifies the frequency shifted reference beam and a collimator 90 that collimates the frequency shifted and amplified reference beam. The output beam 84 is split by a beam splitter 92 so that a small portion of the output beam 84 is split off and combined with the reference beam. The combined beam is focused by a lens 94, and then re-collimated by a lens 96. The combined beam is then received by a detector 98, representing the heterodyne array circuit 34, that converts the combined reference beam and output beam to electrical signals. The electrical signals are then sent to a pulse clipper circuit 100 that clips the pulses, as discussed above, to remove them from the reference beam and the optical leakage in the output beam 84. The electrical signals are then sent to a phase sensor circuit 102 that measures the difference of the phase between the reference beam and the optical leakage in the fiber beams, and provides an electrical signal to each of the phase modulators 56 so that the phase of each fiber beam is controlled to be in phase with the reference beam.

Figure 3:
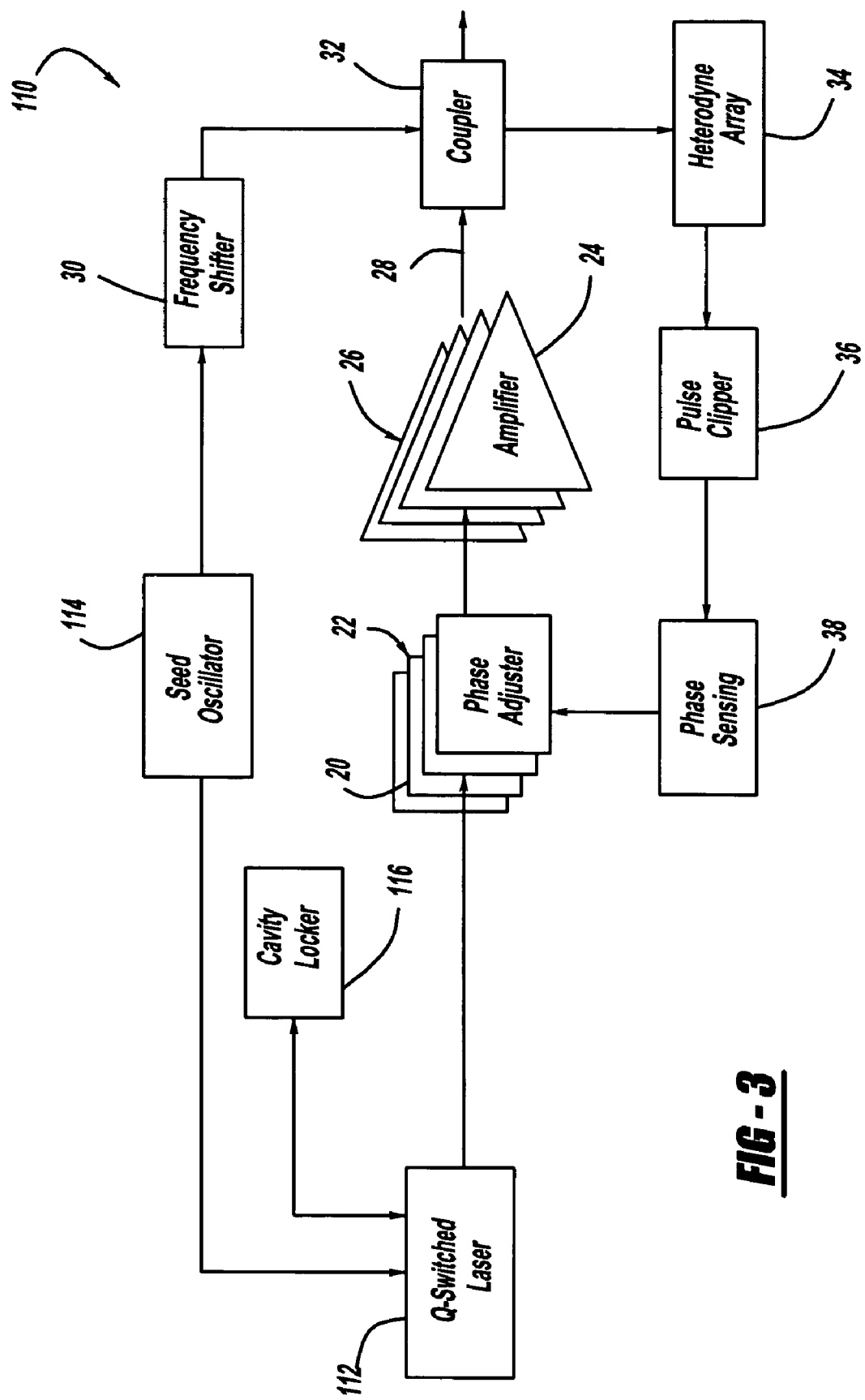
FIG. 3 is a schematic block diagram of a pulsed laser array system that employs a Q-switched laser, a seed oscillator that also provides a reference beam and a cavity locker, according to another embodiment of the present invention.

Different techniques are known in the art for generating and frequency locking a pulsed signal beam and a reference beam. FIG. 3 is a schematic block diagram of a pulsed array laser system 110 similar to the pulsed array laser system 10, where like elements are identified by the same reference numeral. In the system 110, the signal pulse beam is generated directly by a Q-switched laser 112 without the need for an amplitude modulator. A separate seed continuous wave laser oscillator 114 provides the reference beam and an injection seed beam for the Q-switched laser 112. The operation of a Q-switched laser, an injection seed oscillator and a cavity locker in this combination are well known to those skilled in the art. The cavity locker 116 locks the frequency and phase of the pulsed signal beam from the Q-switched laser 112 to the frequency and phase of the injection seed beam. The seed beam between the Q-switched pulses in the signal beam from the Q-switched laser 112 serves as the optical leakage that is used for phase determination. The Q-switched laser output beam is split into a plurality of pulsed fiber beams.

Figure 4:
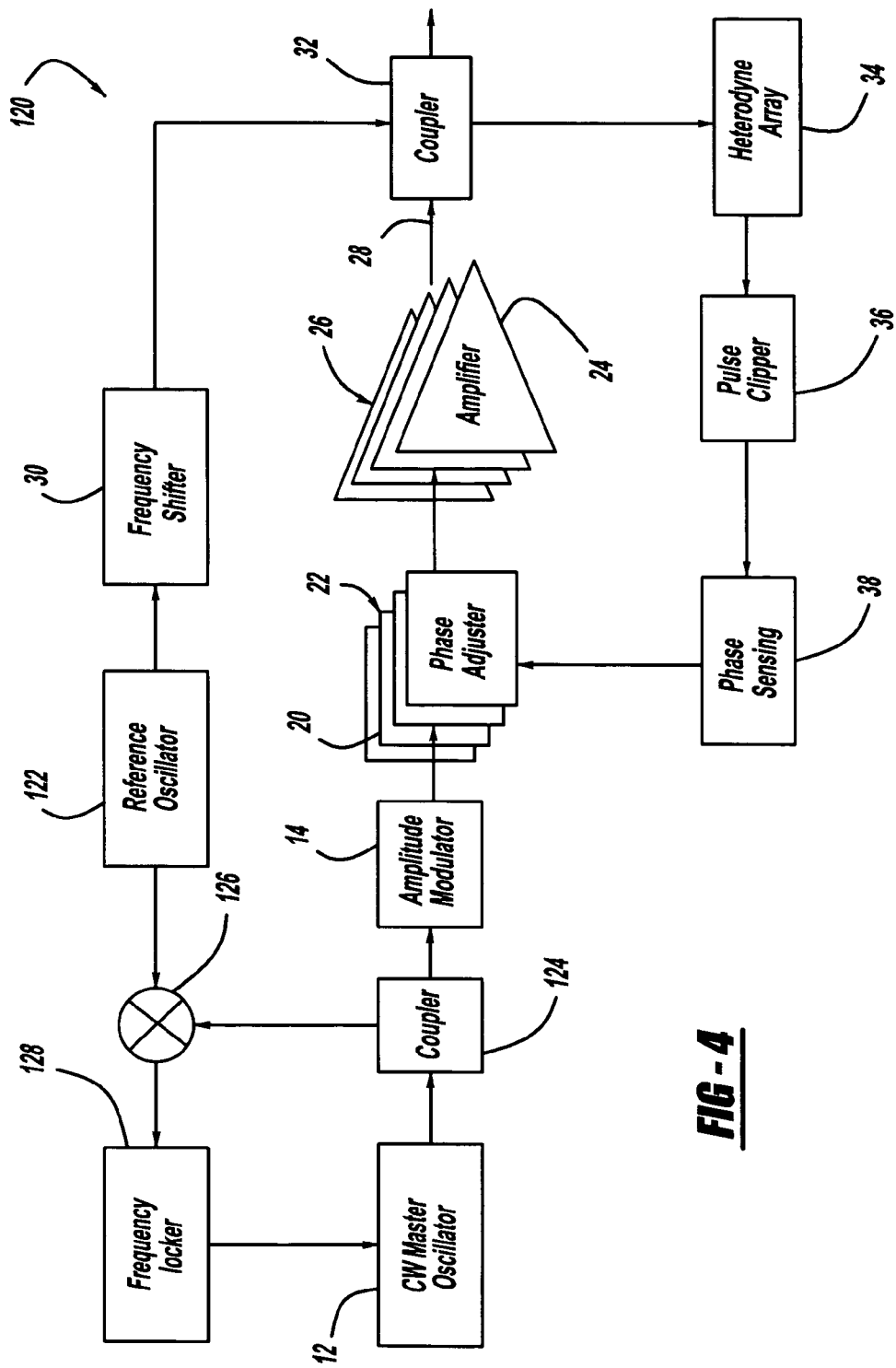
FIG. 4 is a schematic block diagram of a pulsed laser array system that employs frequency locking of a master oscillator to a reference oscillator, according to another embodiment of the present invention.

FIG. 4 is a schematic block diagram of a pulsed array laser system 120 similar to the laser array system 10, where like elements are identified by the same reference numeral. In this design, a continuous wave reference oscillator 122 is used to provide the reference beam. Because the signal beam and the reference beam are generated by different devices, the signal beam and the reference beam need to be frequency and phase locked to provide the phase probing. The frequency of the signal beam from the master oscillator 12 is locked relative to the frequency of the reference beam from the reference oscillator 122 by a frequency locking circuit. A portion of the signal beam from the master oscillator 12 is coupled off by a coupler 124 and mixed with the reference beam from the reference oscillator 122 in a mixer 126 that subtracts and adds the frequency of the beams. The mixed reference beam and pulsed signal beam are frequency locked by a frequency locker circuit 128. If the beams from the master oscillator 12 and the reference oscillator 22 are at the same frequency, then the frequency shifter 30 is necessary to generate the heterodyne signal. However, if the frequency of the reference beam from the reference oscillator 122 is locked to a frequency that is different from the frequency of the signal beam, then the frequency shifter 30 is not required for heterodyne generation.

Figure 5:
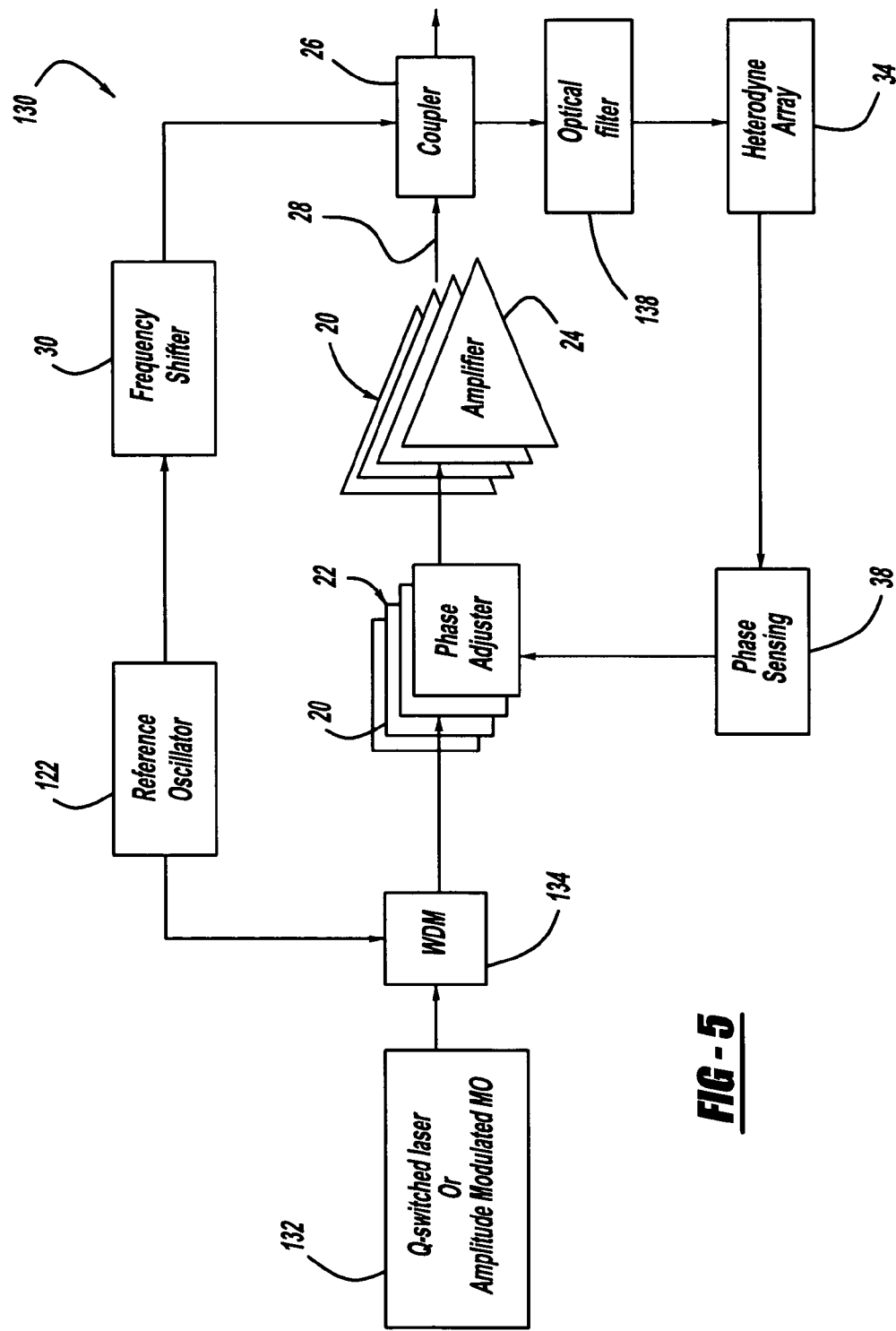
FIG. 5 is a schematic block diagram of a pulsed laser array system that employs a reference oscillator and wavelength division multiplexer, according to another embodiment of the present invention.

FIG. 5 is a schematic block diagram of a pulsed laser array system 130 similar to the laser systems discussed above, where like elements are identified by the same reference numeral. The pulsed signal beam is provided by a Q-switched laser or amplitude modulated master oscillator 132. In this embodiment, the wavelength of the reference beam is different than the wavelength of the signal beam. A wavelength division multiplexer (WDM) 134 combines the reference beam from the reference oscillator 122 and the pulsed signal beam from the Q-switched laser or amplitude modulated master oscillator 132 to probe the phase change through the amplifier chain 26 between the signal beam and the reference beam. An assumption is made that the phase change of the signal beam and the reference beam are well correlated through the amplifier chain 20, which can be achieved, for example, the making the signal beam and the reference beam close in wavelength. The reference beam from the reference oscillator 122 is frequency shifted by the frequency shifter 30 to generate the heterodyne signal. The high peak power pulses can be optically filtered by an optical band-pass filter 136 instead of being electronically clipped by the pulse clipper circuit 36. The system 130 offers a number of advantages including the wavelength that the reference beam can be provided so it does not extract energy form the amplifier chain 20, the reference beam does not interfere with the signal pulse and active sensing and ladar applications, and the pulse clipper circuit is not necessary.

Figure 6:
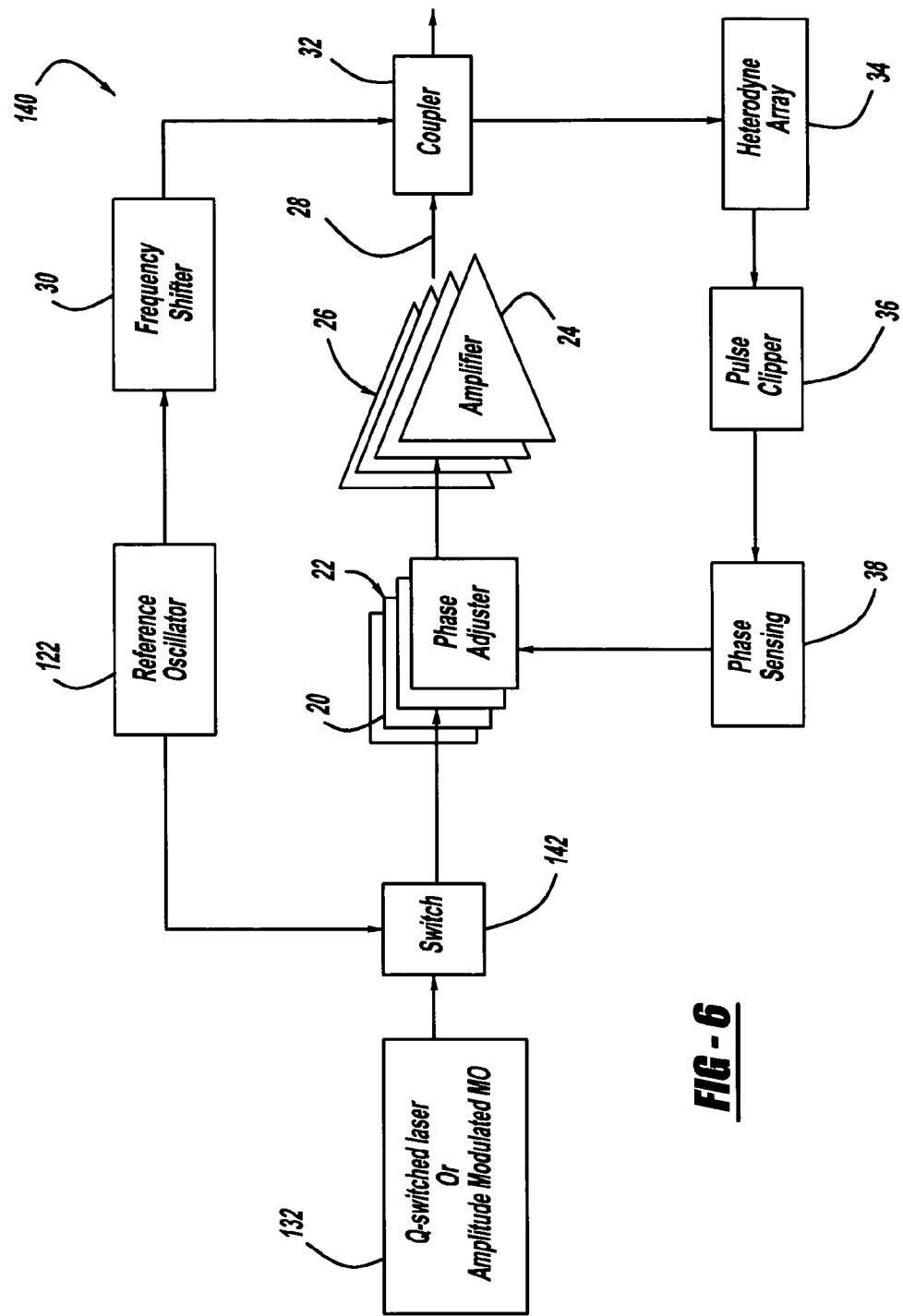
FIG. 6 is a schematic block diagram of a pulsed laser array system that employs a reference oscillator and a time gated switch, according to another embodiment of the present invention.

FIG. 6 is a schematic block diagram of a pulse laser array system 140 similar to the system 130, where like elements are identified by the same reference numeral. In the system 140, the WDM 136 is replaced with a time-gated switch 142. The reference oscillator 122 can be a continuous wave oscillator or a pulsed oscillator. The reference beam is combined with the signal beam at the switch 142 prior to the arrival of the signal pulse. The phase is probed by the reference beam through the amplifier chain 20. As long as the gated reference pulse is longer than the response time of the electronics, the phase locking electronics is the same, as discussed above. The system 140 offers a number of advantages including that the reference pulses can be made small and timed so as to not interfere with the signal pulse in active sensing in ladar applications.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A pulsed laser array system comprising:
a beam generating sub-system for generating a reference beam and a pulsed signal beam that are frequency locked together, said beam generating sub-system providing optical leakage between the signal beam pulses for phase determination;
a beam splitter for splitting the pulsed signal beam into a plurality of split pulsed signal beams for a plurality of fibers;
a phase adjusting array including a plurality of phase adjusters, each phase adjuster receiving a split pulsed signal beam and a phase adjusting signal, each phase adjuster adjusting the phase of the split pulsed signal beam so that each split pulsed signal beam is in phase with the reference beam;
an amplifier chain including at least one amplifier for amplifying each split pulsed signal beam;
a beam coupler receiving the amplified split pulsed signal beams and the reference beam and coupling a portion of the amplified split pulsed signal beams with the reference beam;
a detector array receiving the combined reference beam and the amplified split pulsed signal beams, and converting the combined reference beam and split pulsed amplified signal beams to an electrical signal; and
a phase sensing circuit responsive to the electrical signal from the detector array, said phase sensing circuit measuring the difference in phase of the optical leakage between the pulses in the split pulsed signal beams and the reference beam, and providing the phase adjusting signal to the phase adjusters for adjusting the phase of the split pulsed signal beams to be in phase with the reference beam.

2. The system according to claim 1 further comprising a pulse clipper circuit, said pulse clipper circuit being responsive to the electrical signal from the detector array and clipping the pulses in the split pulsed signal beams so that only the optical leakage and the reference beam is provided to the phase sensing circuit.

3. The system according to claim 1 wherein the beam generating sub-system includes a frequency shifter that shifts the frequency of the reference beam.

4. The system according to claim 1 wherein the beam generating sub-system includes a continuous wave master oscillator for generating a signal beam and the reference beam, and an amplitude modulator for converting the signal beam into the pulsed signal beam.

5. The system according to claim 1 wherein the beam generating sub-system includes a Q-switched laser, an injection seed oscillator and a cavity locker, said Q-switched laser generating the pulsed signal beam, said seed oscillator generating the reference beam and an injection seed beam and said cavity locker locking the frequency of the pulsed signal beam from the Q-switched laser to the frequency of the seed beam.

6. The system according to claim 1 wherein the beam generating sub-system includes a continuous wave master oscillator, an amplitude modulator, a reference oscillator, a mixer and a frequency locker, said master oscillator generating a signal beam, said reference oscillator generating the reference beam, said mixer mixing the reference beam and the signal beam, said frequency locker locking the frequency of the signal beam to the frequency of the reference beam and said amplitude modulator converting the signal beam to the pulsed signal beam.

7. The system according to claim 1 wherein the beam generating sub-system includes a reference oscillator for generating the reference beam, a beam device for generating the pulsed signal beam and a wavelength division multiplexer for combining the pulsed signal beam and the reference beam.

8. The system according to claim 7 wherein the beam device is selected from the group consisting of Q-switched lasers and amplitude modulated master oscillators.

9. The system according to claim 7 further comprising a band pass filter that filters out the pulses after the reference beam is combined with the split pulsed signal beams, but before they are converted to an electrical signal by the detector array.

10. The system according to claim 1 wherein the beam generating sub-system includes a reference oscillator for generating the reference beam, a beam device for generating the pulsed signal beam and a time-gated switch for frequency locking the pulsed signal beam and the reference beam.

11. The system according to claim 1 wherein the detector array is a heterodyne array.

12. The system according to claim 1 wherein the beam pulses have a duration of less than 10 nano-seconds.

13. A pulsed laser array system comprising:
a beam generating sub-system for generating a reference beam and a plurality of split pulsed signal beams that are frequency locked together, wherein optical leakage is provided between the signal beam pulses, said beam generating sub-system including a frequency shifter that shifts the frequency of the reference beam;
a phase adjusting array including a plurality of phase adjusters, each phase adjuster receiving a split pulsed signal beam and a phase adjusting signal, each phase adjuster adjusting the phase of the split pulsed signal beam so that each split pulsed signal beam is in phase with the reference beam;
an amplifier chain including at least one amplifier for amplifying each split pulsed signal beam;
a beam coupler receiving the amplified split pulsed signal beams and the reference beam and coupling a portion of the amplified split pulsed signal beams with the reference beam;
a detector array receiving the combined reference beam and the amplified split pulsed signal beams, and converting the combined reference beam and split pulsed amplified signal beams to an electrical signal;
a pulse clipper circuit being responsive to the electrical signal from the detector array and clipping the pulses in the split pulsed signal beams so that only the optical leakage between the pulses in the split pulsed signal beam and the reference beam remain; and
a phase sensing circuit responsive to the electrical signal from the pulse clipper circuit, said phase sensing circuit measuring the difference in phase of the optical leakage between the pulses of the split pulsed signal beams and the reference beam, and providing the phase adjusting signal to the phase adjusters for adjusting the phase of the split pulsed signal beams to be in phase with the reference beam.

14. The system according to claim 13 wherein the beam generating sub-system includes a continuous wave master oscillator for generating a signal beam and an amplitude modulator for converting the signal beam into the pulsed signal beam.

15. The system according to claim 13 wherein the beam generating sub-system includes a Q-switched laser, an injection seed oscillator and a cavity locker, said Q-switched laser generating the pulsed signal beam, said seed oscillator generating the reference beam and an injection seed beam and said cavity locker locking the frequency of the pulsed signal beam from the Q-switched laser to the frequency of the seed beam.

16. The system according to claim 13 wherein the beam generating sub-system includes a reference oscillator for generating the reference beam, a beam device for generating the pulsed signal beam and a time-gated switch for frequency locking the pulsed signal beam and the reference beam.

17. The system according to claim 16 wherein the beam device is selected from the group consisting of Q-switched lasers and amplitude modulated master oscillators.

18. The system according to claim 13 wherein the detector array is a heterodyne array.

19. The system according to claim 13 wherein the beam pulses have a duration of less than 10 nano-seconds.

20. A pulsed laser array system comprising:
a beam generating sub-system for generating a reference beam and a plurality of split pulsed signal beams that are frequency locked together, wherein optical leakage is provided between the signal beam pulses; and
a phase adjusting array including a plurality of phase adjusters, each phase adjuster receiving a split pulsed signal beam and a phase adjusting signal, each phase adjuster adjusting the phase of the split pulsed signal beam so that each split pulsed signal beam is in phase with the reference beam, wherein the phase adjusting signal is indicative of the difference in phase of the optical leakage between the pulses in the split pulsed signal beams and the reference beam.

21. The system according to claim 20 further comprising a pulse clipper circuit, said pulse clipper circuit clipping the pulses in the split pulsed signal beams so that only the optical leakage and the reference beam remain.

22. The system according to claim 20 wherein the beam generating sub-system includes a frequency shifter that shifts the frequency of the reference beam.

23. The system according to claim 20 wherein the beam pulses have a duration of less than 10 nano-seconds.

* * * * *

UNITED STATES PATENT AND TRADEMARK OFFICE
CERTIFICATE OF CORRECTION

| | | |
|---|---|---|
| PATENT NO. | : 7,502,395 B2 | Page 1 of 1 |
| APPLICATION NO. | : 11/500661 | |
| DATED | : March 10, 2009 | |
| INVENTOR(S) | : Eric Chiu-Tat Cheung et al. | |

It is certified that error appears in the above-identified patent and that said Letters Patent is hereby corrected as shown below:

On the Title Page
Item (75) Inventors:
Please correct the spelling of the first inventor's name:
Eric Chiu-Tat Cheng should be --Eric Chiu-Tat Cheung--

Column 5,
Line 51, "the making ..." should be --then making--

Column 5,
Line 59, "form the ..." should be --from the--

Signed and Sealed this
Fifteenth Day of November, 2011

David J. Kappos
*Director of the United States Patent and Trademark Office*